Patented Oct. 20, 1953

UNITED STATES PATENT OFFICE

2,656,358

ANTIHISTAMINIC SUBSTANCES

Nathan Sperber, Bloomfield, N. J., Domenick Papa, Brooklyn, N. Y., and Erwin Schwenk, Shrewsbury, Mass., assignors to Schering Corporation, Bloomfield, N. J., a corporation of New Jersey No Drawing. Application August 7, 1950, Serial No. 178,166

12 Claims. (Cl. 260—294.8)

The invention relates to the manufacture of new substances which have been found to be highly effective against histamine-induced allergic reactions.

We have found that heterocyclic substituted aliphatic amines of the general formula

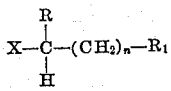

wherein X represents a heterocyclic group which may be substituted by lower alkyl, lower alkoxy, chlorine or bromine, particularly pyridyl and substituted pyridyl groups, $n$ is an integer not less than 2 and not more than 4, R represents an alkyl, aryl, aralkyl, cycloalkyl or heterocyclic group or a chlorinated or brominated derivative of such groups, and $R_1$ represents a dialkylamino, N-piperidino, N-morpholino or imidazolino group, and the salts thereof with inorganic and organic acids possess to an extremely high degree antihistaminic and anti-anaphylactic activity. The aryl, aralkyl and heterocyclic groups may be substituted by lower alkyl, alkoxy and dialkylamino groups, and the heterocyclic groups may be attached to the tertiary carbon by a methylene group.

Compounds of the invention may be made for example by condensing a heterocyclic alkane compound, such as 2- or 4-benzylpyridine, with the appropirate dialkylaminoalkyl halide, haloalkylimidazoline, haloalkylpiperidine or haloalkylmorpholine in the presence of an alkali metal amide, hydride or alkoxide, such as sodium or potassium amides, hydrides and alkoxides, or organometallic compounds of alkali and alkaline earth metals such as alkali metal alkanes and Grignard reagents, for example, butyllithium, ethl magnesium bromide, lithium diethylamide and triphenylmethyl sodium, as condensing catalyst.

The heterocyclic alkane compounds which may be utilized in making the compounds of the invention may be represented by the general formula

X—R₁—R₂ wherein X represents a heterocyclic group which may be substituted by lower alkyl, lower alkoxy, chlorine or bromine, $R_1$ is a saturated aliphatic group, and $R_2$ is a member of the group consisting of alkyl, aryl, aralkyl, cycloalkyl and heterocyclic groups and lower alkyl, alkoxy, dialkylamino, chloro and bromo substitution products thereof.

For example, 2- or 4-benzylpyridine may be condensed with β-dimethylaminoethyl chloride to give 3-phenyl-3-(2-pyridyl)-N,N-dimethylpropylamine and 3-phenyl-3-(4-pyridyl)-N,N-dimethylpropylamine, respectively.

The 2- and 4-benzylpyridines are readily obtained by the condensation of benzyl chloride with pyridine in the presence of a catalytic amount of copper powder. Separation of the isomers is effected by fractional distillation. In place of benzyl chloride substituted derivatives such as p-methoxy-, p-methyl-, and p-isopropyl-benzyl chloride may be used.

Heterocyclic alkyl halides, such as 2-thienyl-methyl chloride, may also be used in place of the benzyl chloride.

A useful method of obtaining intermediates for the compounds of the invention comprises the condensation of aldehydes, such as 2-thiophene-aldehyde with an organometallic compound of pyridine and reducing the resulting carbinol to the corresponding substituted methane.

A further method of obtaining the compounds of the invention is by the reduction of aryl- or heterocyclicpyridyl α, β-ethylenes to the corresponding substituted ethanes and condensation of the ethanes with a dialkylaminoalkyl halide or a haloalkylimidazoline in the presence of butyl-lithium, sodamide or potassium amide.

Other methods for preparing the compounds of the invention include the condensation of 2-thienylmethyl chloride with α-picoline in the presence of potassium amide to give 1-(2-pyridyl)-2-(2-thienyl)ethane which is then brominated to the corresponding 5-bromothienyl compound. α-Picoline may be similarly condensed with 2-chloromethyl-5-bromothiophene to give the 1-(2-pyridyl)-2-(5-bromo-2-thienyl)-ethane directly. The latter compound may be then condensed, for example, with β-dimethyl-aminoethyl chloride in the presence of sodium or potassium amide to give 4-(5-bromo-2-thienyl)-3-(2-pyridyl)-N,N-dimethylbutylamine.

In place of 2-chloromethylthiophene and its bromo derivative, other heterocyclic and aryl alkyl halides may be used. For example, p-bromo- or p-chloro-benzyl chloride and β-(2-pyridyl)-ethyl chloride can be suitably employed in this type of condensation reaction. With 2-(chloromethyl)-imidazoline and the 1-(2-thienyl)-2-(2-pyridyl)ethane, 3-(2-thienyl)-2-(2-pyridyl)-1-(2-imidazolinyl)-propane is obtained.

The compounds of the invention may also be made by the hydrolysis and decarboxylation of the nitriles of the general formula

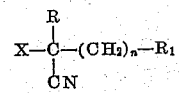

wherein X represents a heterocyclic group which may be substituted by lower alkyl, lower alkoxy, chlorine or bromine, $n$ is an integer from 2 to 4, $R_1$ is a member of the group consisting of dialkylamino, piperidino, morpholino and imidazolinyl groups, R is a member of the group consisting of alkyl, aryl, aralkyl, cycloalkyl and heterocyclic groups and alkyl, alkoxy, dialkylamino, chloro and bromo substitution products thereof.

When the nitriles are treated with a strong acid, an alkali metal amide, or an organometallic compound such as the alkali metal alkanes and alkyl magnesium halides, the nitriles are hydrolyzed and decarboxylated to the compounds of the invention as illustrated by the following equation:

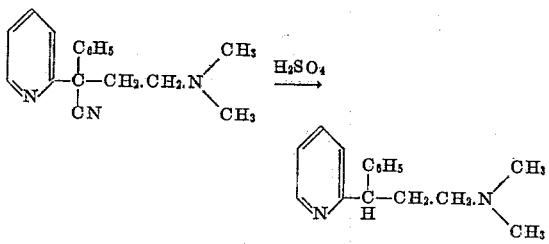

Suitable nitriles for use in making the compounds of the invention may be made by:

(a) condensing a pyridyl, or alkylpyridyl, halide with an alkane, or substituted alkane, nitrile to form a pyridyl alkane nitrile and thereafter condensing the latter product with a dialkylaminoalkyl halide, a piperidinoalkyl halide, a morpholinoalkyl halide, or an imidazolinylalkyl halide;

(b) condensing an alkane, or substituted alkane, nitrile with a dialkylaminoalkyl halide, a piperidinalkyl halide, a morpholinalkyl halide, or an imidazolinylalkyl halide, and condensing the product with a pyridyl, or alkylpyridyl, halide; or (c) condensing in one operation an alkane, or substituted alkane, nitrile and a pyridyl, or alkylpyridyl, halide with a dialkylaminoalkyl halide, a piperidinoalkyl halide, a morpholinoalkyl halide, or an imidazolinylalkyl halide.

The condensations are advantageously effected by heating the reactants in an organic solvent, such as toluene or xylene or in liquid ammonia, in the presence of condensation catalysts, such as alkali metals, alkali metal amides, alkali metal alkoxides, or alkali metal organo compounds, for example, butyllithium or triphenylmethyl sodium.

The following specific examples are illustrative of the methods and products of the invention:

EXAMPLE I

*3-phenyl-3-(2-pyridyl)-N,N-dimethylpropylamine*

To 1.0 mole of potassium amide in 3 liters of liquid ammonia, is added 1.0 mole of 2-benzylpyridine. After 15 minutes, 1.1 moles of β-dimethylaminoethyl chloride are added. The ammonia is allowed to evaporate and the reaction product decomposed with water and ether extracted. The ether layer is dried over sodium sulfate and after evaporation the residue is distilled, giving the 3-phenyl-3-(2-pyridyl)-N,N-dimethylpropylamine, B. P. 139–142° C./1–2 mm.

EXAMPLE II

*3-(2,3-dimethoxyphenyl)-3-(2-pyridyl)-N,N-dimethylpropylamine*

2,3-dimethoxyphenyl-(2-pyridyl) carbinol is prepared by the reaction of 2,3-dimethoxybenzaldehyde and picolinic acid as follows:

A mixture of ten parts of 2,3-dimethoxybenzaldehyde, four parts of picolinic acid and twenty-five parts of cymene are heated for approximately 4–6 hours at 160–170° C. Upon cooling, the reaction product is extracted with aqueous hydrochloric acid and the resulting acid extracts are made alkaline with gaseous ammonia. The dimethoxyphenyl pyridyl carbinol is extracted with ether, the ether washed with water, dried, and, after removal of the ether, the residue is distilled.

To a solution of ten parts of the dimethoxyphenyl pyridyl carbinol in 60 parts of anhydrous benzene cooled to 0° C., there is added dropwise 6.5 parts of thionyl chloride. After the addition is completed, the reaction is allowed to reach room temperature. After standing for several hours, the excess thionyl chloride is cautiously decomposed with 10% potassium carbonate solution so that the resulting mixture is strongly alkaline. The benzene layer is separated, dried over sodium sulfate, filtered and vacuum concentrated. The resulting deep red residue is transferred to a one-liter, three-necked flask provided with a condenser and 50 parts of glacial acetic acid added. With stirring, 11 parts of zinc dust are added with external cooling, if necessary. After stirring and heating for six hours, the reaction mixture is worked up in the known manner to yield the 2,3-dimethoxybenzylpyridine. Condensation of this benzylpyridine with β-dimethylaminoethyl chloride is carried out as described for the corresponding unsubstituted compound. The compound of this example is obtained as a viscous liquid boiling at approximately 195–200° C./1–2 mm.

EXAMPLE III

*3-(3,4-dimethoxyphenyl)-3-(2-pyridyl)-N,N-dimethylpropylamine*

This compound is prepared as described for the 2,3-isomer using veratraldehyde in place of the 2,3-dimethoxybenzaldehyde.

EXAMPLE IV

*3-(2,4-dichlorophenyl)-3-(2-pyridyl)-N,N-dimethylpropylamine*

This compound is obtained in accordance with instructions of Example II when 2,4-dichlorobenzaldehyde is substituted for the 2,3-dimethoxybenzaldehyde. The propylamine is obtained as a viscous yellow liquid.

EXAMPLE V

*3-(2,4-dimethylphenyl)-3-(2-pyridyl)-N,N-dimethylpropylamine*

By substituting 2,4-dimethylbenzaldehyde for 2,3-dimethoxybenzaldehyde in Example II, the compound of this example is obtained as a yellow viscous liquid.

EXAMPLE VI

*3-phenyl-3-(2-pyridyl)-N-piperidinopropane*

2-benzylpyridine is condensed with potassium amide in liquid ammonia with β-N-piperidinoethyl chloride to yield the compound of this example. It is a viscous yellow liquid boiling at 160–165° C./1–2 mm.

EXAMPLE VII

*3-phenyl-3-(2-pyridyl)-N-morpholinopropane*

By substituting β-N-morpholinoethyl chloride for β-N-piperidinoethyl chloride in Example VI, the compound of this example is obtained.

EXAMPLE VIII

*3-(4-dimethylaminophenyl)-3-(2-pyridyl)-N,N-dimethylamine*

By substituting p-dimethylaminobenzaldehyde for 2,3-dimethoxybenzaldehyde used in Example II, the propylamine of this example is obtained as a yellow, somewhat viscous liquid boiling at 183–185° C./1.5 mm.

EXAMPLE IX

*3-(3-aminophenyl)-3-(2-pyridyl)-N,N-dimethylpropylamine*

By substituting m-nitrobenzaldehyde for the 2,3-dimethoxybenzaldehyde of Example II, there is obtained the compound of this example. In the course of making the substituted benzylpyridine, the nitro group is reduced to the amine in the zinc-acetic acid treatment. Prior to reacting the amino substituted benzylpyridine with β-dimethylaminoethyl chloride, the amino group is protected by any suitable means such as acetylation.

EXAMPLE X

*3-(3-acetylaminophenyl)-3-(2-pyridyl)-N,N-dimethylpropylamine*

This substance is obtained from the compound of the preceding example by treatment with acetic anhydride according to the known methods.

EXAMPLE XI

*4 - (5 - bromo - 2 - thienyl) - 3 - (2 - pyridyl) - N,N-dimethylbutylamine*

1 - (2 - pyridyl) - 2 - (2 - thienyl)ethane: To 1.0 mole of potassium amide in 3 liters of liquid ammonia is added 1.0 mole of α-picoline, and after fifteen minutes, 1.1 moles of 2-thienylmethyl chloride. The ammonia is allowed to evaporate. The reaction product is decomposed with water, ether extracted and the ether layer extracted with dilute HCl. The acid layer is made alkaline with ammonia and the oil which separates is ether extracted. The ether layer is dried over sodium sulfate, concentrated and the residue distilled at 106–110° C./0.5 mm.

1 - (5 - bromo - 2 - thienyl) - 2 -(2 - pyridyl)-ethane: To a cooled solution (10° C.) of 1-(2-thienyl)-2-(2-pyridyl)ethane and 21 cc. of acetic acid is added 3 cc. of bromine in 45 cc. of acetic acid with stirring. After one hour, the reaction product is made alkaline with ammonia and the oil which separates is ether extracted, the ether layer is dried over sodium sulfate, concentrated and the residue distilled at 0.5 mm., B. P. 129–133° C.

4 - (5 - bromo - 2 - thienyl) - 3 - (2 - pyridyl)-N,N-dimethylbutylamine: To 1.0 mole of potassium amide in 3 liters of liquid ammonia is added 1.0 mole of 1-(5-bromo-2-thienyl)-2-(2-pyridyl)-ethane. After 15 minutes, 1.1 moles of β-dimethylaminoethyl chloride is added. The ammonia is allowed to evaporate. The reaction mixture is worked up in the manner described in the previous examples and after distillation a light yellow oil is obtained, boiling at 145–148° C./0.5 mm.

The compound of this example may also be prepared by condensing α-picoline with 5-bromothienyl-2-methyl chloride and condensing the product with β-dimethylaminoethyl chloride.

EXAMPLE XII

*4 - (5 - chloro - 2 - thienyl) - 3 - (2 - pyridyl) - N,N-dimethylbutylamine*

This compound is made by the procedure used for the bromo compound. It is a pale yellow liquid, B. P. 140–144° C./0.5 mm.

EXAMPLE XIII

*3-(2-pyridyl)-N,N-dimethyloctylamine*

In an atmosphere of nitrogen 1 mole of 2-(n-hexyl)-pyridine in ether is added to 1 mole of butyllithium in anhydrous ether. After refluxing the reaction for several hours, 1.1 moles of β-dimethylaminoethyl chloride in ether is added and the reaction mixture refluxed for six hours. The reaction product is decomposed with water and the ether layer separated, dried over sodium sulfate and the ether distilled off. The residue is distilled at 1.5 mm., B. P. 104–105° C.

EXAMPLE XIV

*3 - cyclohexyl - 3 - (2 - pyridyl) - N,N-dimethylpropylamine*

To 1.0 mole of 2-pyridyl-N,N-dimethylpropylamine in ether is added 1.0 mole of butyllithium in anhydrous ether in an atmosphere of nitrogen. After several hours of refluxing, 1.1 moles of cyclohexyl bromide in ether is added and the resulting mixture refluxed for six hours. The reaction product is decomposed with water, the ether layer separated and extracted with dilute HCl. The acid layer is made alkaline with ammonia and the resulting oil is ether extracted. The ether layer is dried over sodium sulfate, concentrated and the residue distilled, B. P. 145–150° C./2 mm.

EXAMPLE XV

*1 - (2 - pyridyl) - 1 - phenyl - 2 - (2 - imidazolinyl)ethane*

The compound of this example is made by condensing 2-benzylpyridine with 2-(chloromethyl)-imidazoline.

The intermediate, 2-(chloromethyl)imidazoline, may be made by the reaction of ethyl chloroacetimidate hydrochloride (McElvain & Nelson, J. Am. Chem. Soc. 64, 1825 (1942)) and ethylene diamine (Helv. Chim. Acta 27, 1773 (1944)).

The 1.1 moles of potassium amide in 3 liters of liquid ammonia is added 1 mole of 2-benzylpyridine (Teague, J. Am. Chem. Soc. 69, 714 (1947)). After fifteen minutes, there is added 1 mole of 2-(chloromethyl)imidazoline. The ammonia is allowed to evaporate at room temperature, after which 500 cc. of water is added. The reaction mixture is ether extracted and the compound isolated as described.

In place of potassium amide, butyllithium in ether may be used to condense 2-benzylpyridine with 2-(chloromethyl)imidazoline.

EXAMPLE XVI

*2 - (2 - pyridyl) - 1 - phenyl - 3 - (2-imidazolinyl)propane*

To 1.1 moles of potassium amide in 3 liters of liquid ammonia is added 1 mole of α-dihydrostilbazole. After fifteen minutes, 1 mole of 2-(chloromethyl)imidazoline is added. The ammonia is alloweed to evaporate and the reaction mixture is decomposed with water. The reaction mixture is ether extracted, the ether layer washed with water, dried over sodium sulfate and the solvent removed. The residue is fractionated, B. P. 143–146° C./1 mm.

α-Dihydrostilbazole and 2-(chloromethyl)-imidazoline may be condensed with butyllithium in ether solution.

EXAMPLE XVII

*3 - (2 - thienyl) - 3 - (2 - pyridyl) - N,N-dimethylpropylamine*

The requisite intermediates (2-thienyl)-(2-pyridyl)-carbinol and 2-(2-thenyl) pyridine are made as follows:

In an atmosphere of nitrogen, 39.5 g. of n-butyl chloride is added to a stirred mixture of 6 g. of lithium and 250 cc. of anhydrous ether. When the lithium is completely reacted, the mixture is cooled to —40° C. and a solution of 39.5 g. of 2-bromopyridine in 50 cc. of ether is added. Throughout the addition, the temperature is maintained at —40° C. The reaction mixture is stirred for 15 minutes and 33 g. of 2-thiophenealdehyde is added without allowing the temperature to rise above —30° C. The reaction temperature is then allowed to rise to —15° C. and the mixture is stirred an additional 45 minutes. The reaction mixture is poured into dilute hydrochloric acid and ice, the acid layer separated and after basifying with gaseous ammonia, the oily layer is extracted with ether. The ether extracts are dried and after removing the solvent, the residue is distilled. The (2-thienyl)-(2-pyridyl)-carbinol boils at 138–140° C./1 mm. The carbinol may also be made from 2-pyridyl magnesium bromide and 2-thiophene aldehyde by the conventional Grignard synthesis.

The 2-(2-thenyl) pyridine is made as follows: To a stirred, cooled solution of 49.5 g. of (2-thienyl)-(2-pyridyl)-carbinol in 300 cc. of benzene, there is added slowly 34 g. of thionyl chloride keeping the temperature below 25° C. The reaction mixture is stirred for one hour at room temperature, then cooled, and made alkaline with dilute sodium hydroxide solution, keeping the temperature below 30° C. The benzene layer is separated, washed with water, dried over sodium sulfate and concentrated in vacuo. The residue is dissolved in 300 cc. of glacial acetic acid and the solution added to a one liter, three necked flask equipped with a stirrer and condenser. To the acetic acid solution, there is added in portions 40 g. of zinc dust and the reaction mixture is stirred and heated at 90–95° C. for six hours. The zinc salts are filtered off, the filtrate cooled and then made slightly alkaline with dilute sodium hydroxide solution. The alkaline mixture is extracted with ether, the ether extracts dried and then concentrated. The residue is distilled, B. P. 103–106° C./1 mm.

To potassium amide (from 3.9 g. of potassium) in 500 cc. liquid ammonia, there is added 17.5 g. of 2-(2-thenyl)pyridine. The red solution is stirred for 10 minutes, and 15 g. of β-N,N-dimethylaminoethyl chloride added. The reaction mixture is stirred until the ammonia has evaporated and then decomposed with 200 cc. of water. The oily layer is extracted with ether, the ether extracts dried and then evaporated. The residue, 3-(2-thienyl)-3-(2-pyridyl)-N,N-dimethylpropylamine, distills as a pale yellow oil, B. P. 125–128° C./1 mm.

EXAMPLE XVIII

*3 - (3 - thienyl) - 3 - (2 - pyridyl) - N,N - dimethylpropylamine*

By the same sequence of reactions as described for the 2-isomer of Example XVII, this propylamine is obtained as a yellowish clear liquid, B. P. 134–137° C. at 2–3 mm. The intermediates, (3-thienyl)(2-pyridyl)carbinol and 2-(3-thenyl)-pyridine, boil at 141–143° C./1 mm. and 105–107° C./0.5 mm. respectively.

EXAMPLE XIX

*3 - (5 - methyl - 2 - thienyl) - 3 - (2 - pyridyl) - N,N-dimethylpropylamine*

Condensation of 5-methyl-2-thiophenealdehyde and 2-bromopyridine as described in Example XVII yields the (5-methyl-2-thienyl)(2-pyridyl)carbinol boiling at 146–150° C./1 mm. Treatment of this carbinol with thionyl chloride and subsequent reduction of the chloride with zinc dust gives the 2-(5-methyl-2-thenyl)-pyridine boiling at 108–111° C./0.5 mm. Alkylation with dimethylaminoethyl chloride in accordance with the instructions of Example XVII yields the propylamine boiling at 134–137° C./1 mm.

EXAMPLE XX

*3 - (2 - thienyl) - 3 - (2 - pyridyl) - N,N - diethylpropylamine*

By the procedure of Example XVII using β-diethylaminoethyl chloride in place of the corresponding dimethyl compound, the propylamine of this example is obtained as a yellowish oil, B. P. 130–132° C./1 mm.

EXAMPLE XXI

*3 - (3 - methyl - 2 - thienyl) - 3 - (2 - pyridyl) - N,N-diethylpropylamine*

This propylamine is prepared from 3-methyl-2-thiophenealdehyde and β-diethylaminoethyl chloride as described in the preceding examples, B. P. 138–142° C./2–3 mm.

EXAMPLE XXII

*3 - (5 - chloro - 2 - thienyl) - 3 - (2 - pyridyl) - N,N-dimethylpropylamine*

This chloro compound is prepared from 5-chloro-2-thiophenealdehyde as described in Example XVII, B. P. 142–145° C./1–2 mm.

EXAMPLE XXIII

*3 - (3 - methyl - 5 - chloro - 2 - thienyl) - 3 - (2 - pyridyl)-N,N-dimethylpropylamine*

By a similar sequence of reactions as in Example XVII, this propylamine is obtained from 3-methyl-5-chloro-3-thiophene aldehyde. The substance is a somewhat viscous, pale yellow liquid, B. P. 149–152° C./1 mm.

EXAMPLE XXIV

*3 - (2 - thienyl) - 3 - (6 - methyl - 2 - pyridyl) - N,N-dimethylpropylamine*

By using 6-methyl-2-bromopyridine in place of bromopyridine as in Example XVII, this propylamine is obtained as a yellow-orange liquid, B. P. 133–137° C./1–2 mm.

EXAMPLE XXV

*3 - (5 - methyl - 2 - thienyl) - 3 - (2 - pyridyl) - N-piperidinopropane*

The 2-(5-methyl-2-thenyl)pyridine of Example XIX is condensed with β-N-piperidinoethyl chloride in accordance with the instructions of Example XVII. This tricyclic base is a yellow liquid boiling at 140–144° C./0.5–1 mm.

EXAMPLE XXVI

*3 - (5 - bromo - 2 - thienyl) - 3 - (2 - pyridyl) - N,N-dimethylpropylamine*

The reaction of 5-bromo-2-thiophenealdehyde and bromopyridine as described in Example XVII gives the (5-bromo-2-thienyl)(2-pyridyl)carbinol, B. P. 152–155° C./1 mm. Replacement of the hydroxyl by hydrogen and the subsequent condensation of this compound with β-dimethylaminoethyl chloride gives the compound of this example, B. P. 150–155° C./1–2 mm.

EXAMPLE XXVII

*3-phenyl-3-(2-pyridyl)-N,N-dimethylpropylamine*

To 400 g. of α-phenyl-α-(β-dimethylaminoethyl)-2-pyridylacetonitrile there is added 2,000 g. of 80% sulfuric acid. The mixture is heated with stirring at 140–150° C. for 24 hours. After decomposing with ice and water, the aqueous sulfuric acid solution is made alkaline with ammonia gas. The oil which separates out is extracted with ether, the extract is dried, and, after removing the ether, the residue is distilled giving the 3-phenyl-3-(2-pyridyl)-N,N-dimethylpropylamine, B. P. 139–142° C./1–2 mm.

In addition to the hydrolysis and decarboxylation of the nitriles with 80% sulfuric acid, the conversion may be effected in other ways. For example:

(a) One part of the nitrile and ten parts of 48% hydrobromic acid are refluxed for a period of 50–60 hours. The aqueous hydrobromic acid is removed in vacuo. The residue is made alkaline with gaseous ammonia and the oil which separates is extracted with ether. The ether residue is treated with a saturated alcoholic solution of picric acid heated to boiling and filtered. The insoluble picrate is washed with boiling alcohol. This purification process removes any starting material which, unlike the tertiary amine, forms an alcohol soluble picrate. The insoluble picrate is then decomposed with dilute sodium hydroxide, the amine is isolated by extraction with ether and purified by distillation.

(b) To one part of the nitrile there is added five parts of 80% sulfuric acid and one part of 48% hydrobromic acid. The mixture is heated at a temperature of 130–140° C. for about 30–40 hours and the reaction mixture worked up as in method (a).

(c) One part of the nitrile is refluxed with concentrated hydrochloric acid for about 60 hours. The amine thus formed is isolated and purified as described under method (a).

(d) in a 500 cc. 3-necked flask is suspended 0.2 mole of sodamide in 150 cc. of xylene. To the suspension is added 0.1 mole of the nitrile and the reaction mixture is refluxed with stirring for approximately 15–20 hours. The excess sodamide is decomposed with water, the xylene layer separated and concentrated in vacuo. The residue is fractionated to yield the substituted propylamine.

(e) To 100 cc. of dry ether, there is added 0.6 mole of lithium cut in small pieces. To the stirred mixture is added 0.28 mole of ethyl bromide, allowing the ether to reflux gently. The reaction mixture is refluxed for one hour, cooled to −25° C. in an acetone-Dry Ice bath and 0.1 mole of the nitrile is added dropwise. The deep red mixture is allowed to warm up to room temperature and is stirred for several hours. The complex is decomposed with ice and hydrochloric acid, the acid layer separated and made alkaline with ammonia. The resulting oil is ether extracted, dried and concentrated. The residue is fractionated to yield the compound of this example.

(f) To a 500 cc., 3-necked flask containing 100 cc. of anisole and 0.25 mole of magnesium turnings, there is added 0.285 mole of ethyl bromide, keeping the temperature below 70° C. After the formation of the Grignard reagent is complete, 0.20 mole of the nitrile in 100 cc. of anisole is added, keeping the temperature between 50–60° C. The temperature is kept at about 60° C. for an additional two hours. The reaction mixture is decomposed with 2N hydrochloric acid, the acid layer separated, and then made alkaline with ammonia. The resulting oil is extracted with ether, the ether extracts dried and concentrated. The residue is fractionated to yield the propylamine.

The following compounds having substantial anti-histaminic activity may be made from the corresponding nitriles by the methods of Example XXVII:

3 - phenyl-3-(2 - pyridyl)-N,N - diethylpropylamine, a yellow oil boiling at 156° C./1 mm., from α - phenyl-α-(β - diethylaminoethyl) - 2 - pyridylacetonitrile.

4 - phenyl-3-(2-pyridyl) - N,N - dimethylbutylamine, boiling at about 135° C./0.5 mm., from α-benzyl - α -(β-dimethylaminoethyl) - 2 - pyridylacetonitrile.

3-(2-thienyl)-3-(2 - pyridyl) - N,N - dimethylpropylamine, a pale yellow oil boiling at 125–128° C./1 mm., from α-(2-thienyl)-α-(β-dimethylaminoethyl)-2-pyridylacetonitrile.

4-(2-thienyl)-3-(2 - pyridyl) - N,N - dimethylbutylamine, boiling at 130–133° C./0.1 mm., from α-(2-thienylmethyl)-α-(β- dimethylaminoethyl)-2-pyridylacetonitrile.

3-(p-methylphenyl) - 3 -(2 - pyridyl) - N,N - dimethylpropylamine, boiling at about 130–135° C./0.5 mm., from α-(p-methylphenyl)-α-(β-dimethylaminoethyl)-2-pyridylacetonitrile.

3-(p-methoxyphenyl)-3-(2-pyridyl) - N,N - dimethylpropylamine, boiling at about 137–142° C./0.5 mm., from α-(p-methoxyphenyl)-α-(β-dimethylaminoethyl)-2-pyridylacetonitrile.

3-(p-isopropylphenyl)-3-(2-pyridyl)-N,N - dimethylpropylamine, boiling at 144–147° C./1 mm., from α -(p - isopropylphenyl) - α -(β - dimethylaminoethyl)-2-pyridylacetonitrile.

3 - phenyl - 3 -(6-methyl-2-pyridyl)-N,N - dimethylpropylamine, boiling at 171–175° C./1 mm., from α-(β-dimethylaminoethyl)-α-6-methyl - 2 - pyridyl) -phenylacetonitrile.

3-(p-bromophenyl)-3-(2 - pyridyl) - N,N - dimethylpropylamine, boiling at about 147–152° C./0.5 mm., from α-(p-bromophenyl)-α-(β-dimethylaminoethyl)-2-pyridylacetonitrile.

4-phenyl-4-(2 - pyridyl) - 2 -(dimethylamino)-butane, from α-phenyl-α-(2-pyridyl)-γ-(dimethylamino)-valeronitrile.

4-phenyl-4-(2 - pyridyl)-N,N - dimethylbutylamine, from α-phenyl-α-(2-pyridyl)-γ-(dimethylaminomethyl)-valeronitrile.

3 - cyclohexyl - 3 - (2-pyridyl)-N,N-dimethylpropylamine, from α-cyclohexyl-α-(β-dimethylaminoethyl)-2-pyridylacetonitrile.

4 - cyclohexyl - 3 - (2 - pyridyl)-N,N-dimethylbutylamine, from β-cyclohexyl-α-(β-dimethylaminoethyl)-α-(2-pyridyl)-propionitrile.

3 - (5 - bromo - 2 - thienyl) - 3 - (2 - pyridyl)-N,N-dimethylpropylamine, from α-(5-bromo-2-thienyl) - α - (β - dimethylaminoethyl)-2-pyridylacetonitrile.

4 - (p - bromophenyl) - 3 - (2 - pyridyl)-N,N - dimethylbutylamine, from α-(p-bromobenzyl) - α - (β-dimethylaminoethyl)-2-pyridylacetonitrile.

3 - (p - chlorophenyl) - 3 - (2 - pyridyl)-N,N-dimethylpropylamine from α-(p-chlorophenyl) - α - (β-dimethylaminoethyl)-2-pyridylacetonitrile.

3 - (o - chlorophenyl) - 3 - (2 - pyridyl)-N,N - dimethylpropylamine from α-(o-chlorophenyl) - α - (β-dimethylaminoethyl)-2-pyridylacetonitrile.

EXAMPLE XXVIII

*3,3-bis-(2-pyridyl)-N,N-dimethylpropylamine*

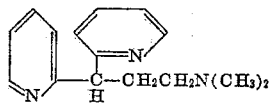

*Preparation of α,α - bis - (2 - pyridyl)acetonitrile.*—In a one-liter, 3-necked flask equipped with stirrer and condenser, 51 g. of sodium is converted to sodamide in the usual manner and the ammonia is replaced by 800 cc. of toluene.

In a five-liter, 3-necked flask equipped with a stirrer, condenser and dropping funnel, are placed 227 g. of 2-chloropyridine, 41 g. of acetonitrile and one liter of toluene. The solution is warmed to 100° C. and a stirred sodamide suspension from 51 g. of sodium is refluxed for an additional 4 hours. The reaction mixture is decomposed with water and the organic layer is separated and extracted with dilute hydrochloric acid. The acid layer is made alkaline with ammonia and the resulting oil is taken up in benzene. The benzene layer is dried over sodium sulfate, filtered and concentrated. The residue distills at 182–192° C./1 mm. Yield: 94 g. The solid material is recrystallized from benzene-petroleum ether, M. P. 137–139° C.

*Preparation of α,α-bis-(2-pyridyl)-α-(N,N-dimethylaminoethyl) acetonitrile.*—Seven grams of sodium is converted to sodamide in the usual manner, and the ammonia is replaced by 200 cc. of toluene. In a one-liter flask are placed 49 g. of α,α-bis(2-pyridyl)acetonitrile and 300 cc. of toluene. The mixture is heated almost to boiling and to the resulting solution is added 32 g. of β-N,N-dimethylaminoethyl chloride. To the warm solution, the sodamide suspension is added, causing reflux. The reaction is refluxed for an additional 4 hours. The reaction mixture is decomposed with water and the organic layer is vacuum-concentrated. The residue is fractionated as a deep red, viscous oil, B. P. 165–172° C./0.5 mm.

*Preparation of 3,3 - bis - (2-pyridyl)-N,N-dimethylpropylamine.*—In a 500 cc., 3-necked flask equipped with a stirrer, condenser and thermometer are placed 25 g. of α,α-bis-(2-pyridyl)-α-(N,N-dimethylaminoethyl)acetonitrile and 135 g. of 70% sulfuric acid. The stirred solution is heated at 130° C. for 5 hours until the evolution of carbon dioxide has ceased. The solution is poured on ice, made alkaline with ammonia and the resulting oil is ether extracted. The ether layer is dried over sodium sulfate, filtered and evaporated. The residue is fractionated, B. P. 129–132° C./0.5 mm.

EXAMPLE XXIX

*3-(2-furyl)-3-(2-pyridyl)-N,N-dimethylpropylamine*

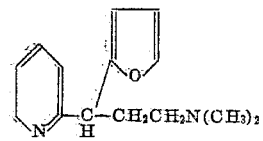

The intermediate, 2-furylacetonitrile, is obtained from furfural by the well-known reaction with rhodanine (J. A. C. S. 57, 1126 (1935)). To a mixture of 0.5 mole of 2-furylacetonitrile, 0.5 mole of 2-chloropyridine and 0.5 mole of β-N,N-dimethylaminoethyl chloride in 500 cc. toluene there is added one mole of sodamide suspended in 350 cc. of toluene. The reaction mixture is heated at about 100° C. for several hours and then cautiously decomposed with water. The toluene layer is extracted with dilute hydrochloric acid and the acid extracts then made alkaline with gaseous ammonia. The resulting oil is extracted with ether. The ether extracts are washed and after removing the ether, the crude trisubstituted acetonitrile is treated either with 80% sulfuric acid or with sodamide in xylene solution to yield the propylamine of this example.

EXAMPLE XXX

*3-(2-pyridyl)-3-(2-thiazyl)-N,N-dimethylpropylamine*

Equations for the preparation of this compound are given as equations (1), (2), and (3):

(1)
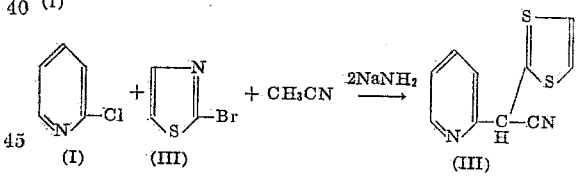

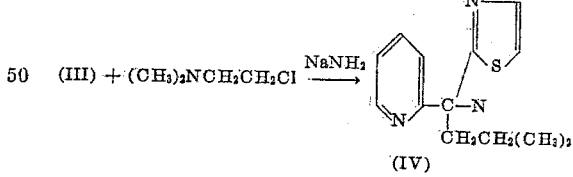

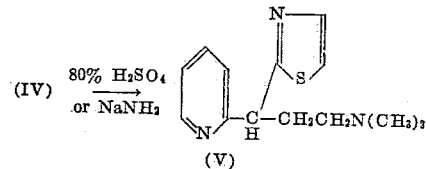

(2)
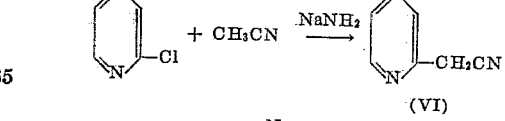

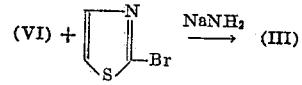

(3)
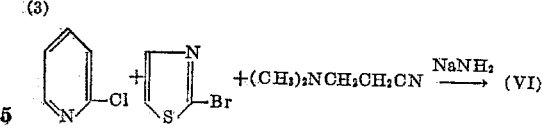

Equation 1 illustrates the simultaneous condensation of 2-chloropyridine (I) and 2-bromothiazole (II) with acetonitrile. Such condensations are usually carried out in toluene solution at about 100° C. with sodamide as condensing catalyst. The intermediate nitrile (III) is then condensed under similar conditions with either the free base, β-N,N-dimethylaminoethyl chloride, or with the hydrochloride salt. In the latter case, two equivalents of sodamide are required; one for the condensation reaction and one to liberate the free amine and neutralize the hydrochloric acid. The tri-substituted acetonitrile (IV) on treatment with a strong mineral acid such as 80% sulfuric acid readily loses the CN group to yield the desired substituted propylamine (V). Removal of the CN group is also effected by treatment of the nitrile (IV) with one equivalent of sodamide in either boiling toluene or xylene solution.

Equation 2 illustrates an alternate method for securing the disubstituted nitrile (III). Acetonitrile is condensed with one equivalent of sodamide in toluene solution with 2-chloro- or 2-bromopyridine to yield the substituted acetonitrile (VI), which on further treatment with one mole of sodamide and one mole of 2-bromothiazole yields the nitrile (III).

Equation 3 illustrates an alternate method for obtaining the trisubstituted nitrile (IV). In most cases, this method is to be preferred; since, by one step, the intermediate (IV) is obtained in contrast with the other methods which require two steps. The requisite γ-N,N-dimethylaminobutyronitrile is readily made by the reaction of γ-chloro- or γ-bromobutyronitrile with dimethylamine. In place of dimethylamine, other dialkyl amines may be used, such as diethyl, dipropyl, and dibutylamine.

The method illustrated in Equation 1 is carried out as follows: To one mole of acetonitrile in 500 cc. of toluene, there is added 0.5 mole of 2-chloropyridine and 0.5 mole of 2-bromothiazole. The resulting mixture is then heated to approximately 40–60° C. and a suspension of one mole of sodamide in 300 cc. of toluene is cautiously added. Upon completion, the reaction mixture is heated for approximately three hours at 100° C. and then cautiously decomposed with water. The toluene layer is processed for the nitrile (III) as described in Example XXIX. Condensation with β-N,N-dimethylaminoethyl chloride to the nitrile (IV) is effected using sodamide as condensing agent. The tri-substituted nitrile (IV) is used without further purification for the preparation of the propylamine (V). The latter reaction is carried out as follows: A mixture of 0.5 mole of the nitrile (IV), 0.5 mole of sodamide and 350 cc. of xylene is heated with stirring for about 8–12 hours at 120–140° C. After cooling the reaction mixture to 60° C., it is cautiously decomposed with water and the xylene layer isolated. After washing and drying and removing the xylene, the propylamine (V) is purified by fractional distillation. There is obtained, as a very pale yellow, free-flowing liquid, the compound of this example boiling at 138–140° C./2 mm.

The method illustrated by Equation 2 is carried out as follows: To one mole of acetonitrile in 500 cc. of toluene, there is added 0.7 mole of 2-chloropyridine. To this mixture 0.7 mole of sodamide is added at about 60° C. and the condensation completed as described above. The crude 2-pyridylacetonitrile is used without distillation in the subsequent condensation with 2-bromothiazole. The thus obtained disubstituted nitrile (III) is converted into the propylamine (V) as described above.

The method illustrated by Equation 3 is carried out in essentially the same manner as the condensations described above. The simultaneous condensations may be made with both halides or a condensation with 2-chloropyridine may be the primary step, followed by condensation with 2-bromothiazole. It has been found advantageous to isolate the product of the first condensation prior to condensation with the second halide. The thus obtained tri-substituted nitrile (IV) is then treated by the described methods to yield the propylamine (V).

EXAMPLE XXXI

*3-(2-pyridyl)-3-(2-thiazyl)-N,N-diethylpropylamine*

This compound is prepared in exactly the same manner as described for the homologous dimethyl compound by substituting β-N,N-diethylaminoethyl chloride in Example XXX.

EXAMPLE XXXII

*3-(2-pyridyl)-3-(2-pyrimidyl)-N,N-dimethylpropylamine*

This compound is made by the methods outlined in Equations 1, 2, and 3 by substituting 2-chloropyrimidine for the 2-bromothiazole. The intermediate, 2-chloropyrimidine, is prepared by the diazotization of 2-aminopyrimidine in concentrated hydrochloric acid with sodium nitrite in the conventional manner. The pyridyl-pyrimidyl-propylamine is a colorless, free-flowing liquid boiling at 135–140° C./1 mm.

EXAMPLE XXXIII

*3,3-bis-(2-thiazyl)-N,N-dimethylpropylamine*

This compound is made by the condensation of acetonitrile with 2 moles of 2-bromothiazole in accordance with the method described for the corresponding bis-(2-pyridyl) compound of Example XXVIII. The reaction may be illustrated by the following equation:

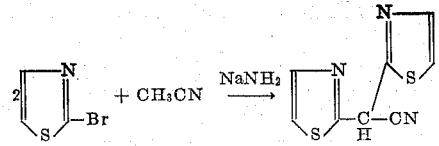

Condensation of the bis-(2-thiazyl)acetonitrile with β-N,N-dimethylaminoethyl chloride as described in Example XXVIII yields the trisubstituted nitrile α,α-bis-(2-thiazyl)-α-(N,N-dimethylaminoethyl)acetonitrile, which without purification is treated with 80% sulfuric acid. The resulting reaction mixture is worked up as described in Example XXVIII to yield the propylamine of this example.

EXAMPLE XXXIV

*4,4-bis-(2-thiazyl)-N,N-dimethylbutylamine*

This compound is made from α,α-bis-(2-thiazyl)-acetonitrile and γ-dimethylaminopropyl chloride by the method outlined in the preceding example.

EXAMPLE XXXV

*3-(2-pyrimidyl)-3-(2-thiazyl)-N,N-dimethylpropylamine*

The preparation of this compound is carried out essentially as described in Equations 2 and 3 of Example XXX. Condensation of 2-chloropyrimidine and acetonitrile yields the 2-pyrimidylacetonitrile, which is subsequently condensed with 2-bromothiazole. The disubstituted nitrile, α-(2-pyrimidyl)-α-(2-thiazyl)acetonitrile, is then condensed with β-N,N-dimethylaminoethyl chloride. The resulting trisubstituted acetonitrile is hydrolyzed with 80% sulfuric acid at 135–140° C. for two hours to yield the propylamine. In this preparation it is not necessary to isolate the intermediates since the toluene solution of the intermediate nitriles can be dried and used directly for the subsequent reactions. It has been found that a ratio of one part of the trisubstituted nitrile and three parts of 80% sulfuric acid at the given temperature gives yields of the final product exceeding 90%.

EXAMPLE XXXVI 2-dimethylamino-4-(2-pyrimidyl)-4-(2-thiazyl)butane

This compound is made in the manner described in Example XXXV by substituting β-N,N-dimethylaminopropyl chloride for the β-N,N-dimethylaminoethyl chloride of the preceding example.

EXAMPLE XXXVII 3-(2-thiazyl)-3-(2-thienyl)-N,N-dimethylpropylamine

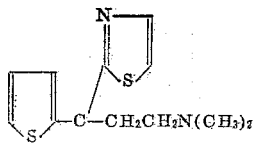

The intermediate 2-thienylacetonitrile is obtained from 2-thienylmethyl chloride by the reaction with potassium cyanide in aqueous alcohol. Condensation of this nitrile with 2-bromothiazole proceeds in the manner described in the previous example and yields the disubstituted acetonitrile, which is not isolated but is directly condensed with β-N,N-dimethylaminoethyl chloride. The trisubstituted nitrile in crude form is treated with 80% sulfuric acid at 130–140° C. for four hours. The acid reaction mixture is worked up in accordance with the instructions of the previous example and the propylamine purified by fractional distillation.

EXAMPLE XXXVIII 3-(2-thiazyl)-3-(2-thienyl)-N-piperidinopropane

By substituting β-N-piperidinoethyl chloride for the β-N,N-dimethylaminoethyl chloride in the preceding example, there is obtained the N-piperidino-substituted propane.

EXAMPLE XXXIX 3-(2-pyrazyl)-3-(2-thiazyl)-N,N-dimethylaminopropane

This compound is obtained by the condensation of acetonitrile with 2-chloropyrazine followed by condensation with 2-bromothiazole. The intermediate disubstituted acetonitrile is then condensed with β-N,N-dimethylaminoethyl chloride and the resulting nitrile treated with 80% sulfuric acid. The various reactions are carried out essentially as described in the previous examples.

EXAMPLE XL 3-(2-thiazyl)-3-(2-furyl)-N,N-dimethylpropylamine

By substituting 2-bromothiazole for the 2-chloropyridine of Example XXIX, there is obtained the propylamine of this example.

EXAMPLE XLI 3-(2-thienyl)-3-(2-pyridyl)-N,N-dimethylpropylamine

This compound can be obtained as a pale yellow oil boiling at 154° C./2 mm. from α-(2-thienyl)-α-(β-dimethylaminoethyl)-2-pyridylacetonitrile, which may be made by substituting 2-chloropyridine for the 2-bromothiazole in the procedure of Example XXXVII.

EXAMPLE XLII 4-(2-thienyl)-3-(2-pyridyl)-N,N-dimethylbutylamine

This compound, boiling at 130–133° C./0.1 mm., is obtained if the bromination step is omitted from the procedure of Example XL. It may also be obtained from α-(2-thienyl-methyl)-α-(β-dimethylaminoethyl)-2-pyridylacetonitrile by treatment with strong acids.

EXAMPLE XLIII 4-(2-furyl)-3-(2-pyridyl)-N,N-dimethylbutylamine

The intermediate, 2-furylmethyl chloride, is prepared as described in J. A. C. S. 50, 1955 (1928) and condensation of this chloride with α-picoline in the presence of potassium amide is effected in accordance with the procedure of Example XLII. The resulting 1-(2-furyl)-2(2-pyridyl)-ethane is obtained as a pale yellow to colorless liquid, boiling at 112–116° C./1 mm. Condensation of the substituted ethane compound with β-dimethylaminoethyl chloride and potassium amide proceeds in good yield by the procedure of Example I. The dimethylamino compound of this example is obtained as a yellowish, free-flowing liquid, B. P. 140–146° C./2–3 mm.

EXAMPLE XLIV 3,4-di-(2-pyridyl)-N,N-dimethylbutylamine

The intermediate, 1,2-di-(2-pyridyl)ethane, is prepared by the condensation of α-picoline and 2-pyridyl-aldehyde by refluxing for 15–17 hours an equimolar mixture of these substances in acetic anhydride. The excess acetic anhydride is decomposed with methanol and the solution steam distilled. The residue, which comprises 1,2-di-(2-pyridyl)-ethylene, is dissolved in 95% ethanol and is reduced to the saturated ethane derivative in a conventional low pressure hydrogenator with Raney nickel catalyst.

The crude dipyridyl ethane is then directly condensed with β-dimethylaminoethyl chloride in accordance with the procedure of Example I to yield the compound of this example, B. P. 145–150° C./3–5 mm.

EXAMPLE XLV 4-(1,4-pyrazyl)-3-(2-pyridyl)-N,N-dimethylbutylamine

The intermediate, 1,4-pyrazylmethyl chloride, is prepared from the 2-carboxylic acid by standard reactions. Reduction of the acid with lithium aluminum hydride in an inert organic solvent gives the substituted methanol, which on treatment with thionyl chloride in the presence of a strong base, dimethyl aniline, yields the methyl chloride (J. A. C. S. 63, 257 (1941)). By the sequence of reactions illustrated in Example XLV, the dimethylamino compound of this example is obtained as a yellowish to orange oil boiling with slight decomposition at approximately 144–150° C./1–2 mm.

EXAMPLE XLVI

*4-(3-methylthiazyl)-3-(2 - pyridyl)-N,N-dimethylbutylamine*

The 4-methyl-5-thiazyl carboxylic acid, described in J. Chem. Soc., 1946, 87–91, is readily converted to the methyl chloride derivative as described in the previous example. By the sequence of reactions shown in Example XLV, the thiazyl amine of this example is obtained.

EXAMPLE XLVII

*4-(thiazyl)-3-(2 - pyridyl) - N,N - dimethylbutylamine*

The 5-thiazyl carboxylic acid described in Helv. chim. acta 28, 924 (1945), is readily converted to the methyl chloride derivative as described above. By the sequence of reactions described in Example XLV, the thiazyl amine of this example is obtained, B. P. 138–140° C./0.5 mm.

The compounds of the invention may be used in the form of the free bases or in the form of the salts thereof with inorganic acids such as hydrochloric, hydrobromic, sulfuric and phosphoric acids and organic acids, such as salicylic, tartaric, maleic, succinic, citric, lactic and other acids.

The compounds may be used in a variety of forms, such as tablets for oral administration, creams for topical application, and injectible solutions. Preferably the salts of the compounds are used in the creams which may be of the usual formulations. The injectible solutions comprise non-toxic salts.

This application is a continuation-in-part of our application Serial No. 782,688, filed October 28, 1947, now abandoned, and contains subject matter in common with our applications Serial No. 20,108, filed April 9, 1948, now abandoned, and Serial No. 26,246, filed May 10, 1948, now Patent No. 2,567,245.

We claim:

1. Compounds of the general formula

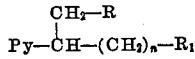

wherein Py is a member of the group consisting of pyridine and lower alkyl pyridine rings, R is a member of the group consisting of phenyl, thienyl, furyl, pyridyl, thiazyl, and pyrazyl groups and their lower alkyl, lower alkoxy, chlorine and bromine substitution products, $n$ is not less than 2 and not more than 4, and $R_1$ is a member of the group consisting of dialkylamino, N-morpholino, N-piperidino and imidazolino groups and the acid addition salts thereof.

2. Compounds as defined in claim 1 wherein R is phenyl.
3. 4-phenyl-3-(2 - pyridyl) - N,N - dimethylbutylamine.
4. 4-(2-thienyl)-3-(2-pyridyl)-N,N - dimethylbutylamine.
5. 4-(5-chloro-2-thienyl)-3-(2 - pyridyl)-N,N-dimethylbutylamine.
6. 4-(2-furyl)-3-(2-pyridyl) - N,N - dimethylbutylamine.
7. 4-(thiazyl)-3-(2-pyridyl) - N,N - dimethylbutylamine.
8. Compounds of the following formula

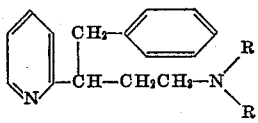

wherein R is a lower alkyl group.

9. Compounds of the following formula

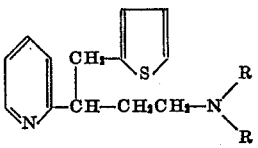

wherein R is a lower alkyl radical.

10. Compounds of the following formula

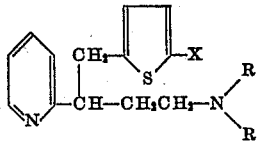

wherein R is a lower alkyl radical and X is a halogen having an atomic number not less than 17 and not more than 35.

11. Compounds of the following formula

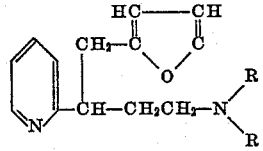

wherein R is a lower alkyl radical.

12. Compounds of the following formula

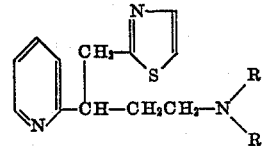

wherein R is a lower alkyl radical.

NATHAN SPERBER.
DOMENICK PAPA.
ERWIN SCHWENK.

No references cited.